United States Patent
Mitchell et al.

(10) Patent No.: US 9,017,550 B2
(45) Date of Patent: Apr. 28, 2015

(54) EXFILTRATION APPARATUS

(75) Inventors: Gayle Mitchell, Athens, OH (US); Shad Sargand, Athens, OH (US)

(73) Assignee: Ohio University, Athens, OH (US)

( * ) Notice: Subject to any disclaimer, the term of this patent is extended or adjusted under 35 U.S.C. 154(b) by 333 days.

(21) Appl. No.: 11/952,560

(22) Filed: Dec. 7, 2007

(65) Prior Publication Data

US 2008/0245710 A1 Oct. 9, 2008

Related U.S. Application Data

(60) Provisional application No. 60/869,308, filed on Dec. 8, 2006, provisional application No. 60/949,089, filed on Jul. 11, 2007.

(51) Int. Cl.
*C02F 1/28* (2006.01)
*E03F 5/16* (2006.01)
(Continued)

(52) U.S. Cl.
CPC .............. *C02F 1/288* (2013.01); *C02F 1/001* (2013.01); *C02F 1/281* (2013.01); *C02F 1/283* (2013.01); *C02F 2103/001* (2013.01); *E03F 1/00* (2013.01); *E03F 5/0404* (2013.01)

(58) Field of Classification Search
CPC .... B01D 21/0045; B01D 23/18; B01D 29/33; B01D 29/111; B01D 29/54; B01D 29/0027; B01D 29/52; B01D 35/027; B01J 2219/3221; B01J 2219/32213; B01J 2219/32268; B01J 2219/32272; B01J 2219/32408; E02B 11/005; C02F 1/001; C02F 1/281; C02F 1/283; C02F 1/286; C02F 1/288; C02F 2103/001; E03F 1/00; E03F 1/005; E03F 5/0404; E03F 5/16

USPC .............. 210/170.03, 85, 237, 335, 232, 802, 210/163, 164, 248, 255, 266, 282, 283, 284, 210/290, 323.1, 435, 513, 521, 694; 137/236.1; 404/4, 5; 405/43, 45
See application file for complete search history.

(56) References Cited

U.S. PATENT DOCUMENTS 142,238 A * 8/1873 Jenings ...................... 15/104.31
661,189 A * 11/1900 Olsen et al. .................... 210/266
(Continued)

OTHER PUBLICATIONS

AdvanEDGE Pipe brochure, AdvanEDGE: the panel pipe, 8 pgs., copyright 1999, Advanced Drainage Systems, Inc., Form #10216, rev Apr. 2001, printed USA.
(Continued)

*Primary Examiner* — Lore Jarrett
*Assistant Examiner* — Patrick Orme
(74) *Attorney, Agent, or Firm* — Calfee, Halter & Griswold LLP (57) ABSTRACT

An exfiltration apparatus for removing contaminants from a fluid, the exfiltration apparatus including a housing defining a fluid flow path and having a first filter/sorptive layer positioned within a first portion of the housing and a second filter/sorptive layer positioned within a second portion of the housing. The first portion of the housing and the first filter/sorptive layer are removable as a unit from the second portion of the housing. The exfiltration apparatus may also include a container positioned within the second filter/sorptive layer and a third filter/sorptive layer disposed within the container. The exfiltration apparatus may also include a container defining a fluid retaining chamber. The chamber may be generally positioned between the first filter/sorptive layer and the second filter/sorptive layer.

8 Claims, 6 Drawing Sheets (51) Int. Cl.
*E03F 1/00* (2006.01)
*E03F 5/04* (2006.01)
*C02F 1/00* (2006.01)
*C02F 103/00* (2006.01)

(56) References Cited

U.S. PATENT DOCUMENTS

| | | | |
|---|---|---|---|
| 1,117,601 A | 11/1914 | Porter | |
| 1,403,311 A | 1/1922 | Gaillet | |
| 1,910,758 A | 5/1933 | Dundore | |
| 3,337,454 A | 8/1967 | Gruenwald | |
| 3,847,813 A | 11/1974 | Castelli | |
| 4,207,291 A | 6/1980 | Byrd et al. | |
| 4,208,288 A * | 6/1980 | Stannard et al. | 210/277 |
| 4,261,823 A * | 4/1981 | Gallagher et al. | 210/164 |
| 4,430,228 A * | 2/1984 | Paterson | 210/665 |
| 4,643,834 A | 2/1987 | Batutis | |
| 4,888,989 A * | 12/1989 | Homer | 73/304 C |
| 4,982,533 A * | 1/1991 | Florence | 52/169.5 |
| 5,223,154 A * | 6/1993 | MacPherson et al. | 210/790 |
| 5,591,331 A * | 1/1997 | Nurse, Jr. | 210/232 |
| 5,607,584 A | 3/1997 | Swiatek et al. | |
| 5,762,810 A | 6/1998 | Pelton et al. | |
| 5,810,510 A * | 9/1998 | Urriola | 405/45 |
| 5,820,762 A * | 10/1998 | Bamer et al. | 210/661 |
| 6,328,778 B1 | 12/2001 | Richerson et al. | |
| 6,468,942 B1 | 10/2002 | Sansalone | |
| 6,767,160 B2 * | 7/2004 | Sansalone | 404/17 |
| 6,869,528 B2 * | 3/2005 | Pank | 210/170.03 |
| 6,938,461 B1 | 9/2005 | Johnson | |
| 7,105,086 B2 | 9/2006 | Saliba | |
| 7,160,444 B2 | 1/2007 | Peters, Jr. et al. | |
| 2003/0094713 A1 | 5/2003 | Sunder et al. | |
| 2005/0067338 A1 * | 3/2005 | Page | 210/164 |
| 2006/0016767 A1 * | 1/2006 | Olson et al. | 210/767 |
| 2006/0032807 A1 | 2/2006 | Sansalone | |
| 2006/0163147 A1 | 7/2006 | Dierkes et al. | |

OTHER PUBLICATIONS

AbTech Industries, Smart Sponge brochure, May 29, 2007, 4 pgs.
Cleaning Up Stormwater Runoff, 2 pgs., UW Extension, University of Wisconsin, copyright 1999.
Sansalone et al., "An infiltration device as a best management practice for immobilizing heavy metals in urban highway runoff", Wat. Sci. Tech., vol. 32, No. 1, pp. 119-125, 1995.
Sansalone et al., "In situ partial exfiltration of rainfall runoff. I: Quality and quantity attenuation", J. of Environmental Engineering, pp. 990-1007, Sep. 2004.
Transcript, Ohio Dept. of Transportation Employee Newsletter, Nov. 2006, 8 pgs.
ODOT Request for Proposals PS-07-21, available on the Ohio Department of Transportation website on Sep. 27, 2006, 13 pgs.
PCT International Search Report and Written Opinion from co-pending PCT International Patent Application No. PCT/US07/86769 having a mailing date of May 5, 2008.
Applicant-Initiated Interview Summary dated May 14, 2013, for corresponding U.S. Appl. No. 13/092,509.
Amendment filed May 17, 2013, for corresponding U.S. Appl. No. 13/092,509.
Final Office Action dated Aug. 15, 2013, for corresponding U.S. Appl. No. 13/092,509.
Non-Final Rejection mailed Jan. 24, 2013 for U.S. Appl. No. 13/092,509.

* cited by examiner

EXFILTRATION APPARATUS

RELATED APPLICATIONS

This application claims priority to, and any benefit of, U.S. Provisional Patent Application Ser. No. 60/869,308, filed on Dec. 8, 2006, entitled IMPROVED EXFILTRATION APPARATUS, and U.S. Provisional Patent Application Ser. No. 60/949,089, filed on Jul. 11, 2007, entitled IMPROVED EXFILTRATION APPARATUS, the entire disclosures of which are fully incorporated herein by reference.

DESCRIPTION OF DRAWINGS

In the accompanying drawing, which are incorporated in and constitute a part of the specification, embodiments of the invention are illustrated, which, together with the detailed description given below, serve to exemplify embodiments of the invention.

DETAILED DESCRIPTION

The present application discloses an improved exfiltration apparatus for removing contaminants from surface runoff water, such as for example, stormwater or snowmelt that does not soak into the ground. In one embodiment, the apparatus is realized as an exfiltration trench, installable in the ground, that includes at least one filter/sorptive layer (i.e. a layer that provides a filtering and/or sorptive function). While the embodiments illustrated and described herein are presented in the context of a rectangular, two-piece exfiltration trench having a first filter/sorptive layer made of porous concrete and a second filter/sorptive layer for highway drainage applications, those skilled in the art will readily appreciate that the present invention may be used and configured in other ways. For example, the exfiltration apparatus may be used in applications other than highway drainage, including, but not limited to, filtering run-off water from parking lots, railway tracks/right-of-way and railway yards, golf courses, or any application in which cleaning water or some other fluid is desired. In addition, the apparatus is not required to be two-pieces or any particular shape or size. An apparatus having more than two pieces, for example, may be used. Furthermore, the apparatus can have more or less than two filter/sorptive layers. Any number of layers may be used for a particular application. Still further, the materials used for the layers need not necessarily be porous concrete or a particular filter or sorptive material. The materials used to filter out suspended and/or dissolved material may be selected from a broad range of suitable materials for a specific application of the apparatus. For example, in a particular application, a certain metal or organic material may be more prevalent in the surface water runoff. The number of material layers, the order in which the fluid contacts each layer, and the type of material used in the layers may be customized for the particular application to remove the certain metal or organic material.

While various aspects and concepts of the invention are described and illustrated herein as embodied in combination in the exemplary embodiments, these various aspects and concepts may be realized in many alternative embodiments, either individually or in various combinations and sub-combinations thereof. Unless expressly excluded herein all such combinations and sub-combinations are intended to be within the scope of the present invention. Still further, while various alternative embodiments as to the various aspects and features of the invention, such as alternative materials, structures, configurations, methods, devices, and so on may be described herein, such descriptions are not intended to be a complete or exhaustive list of available alternative embodiments, whether presently known or identified herein as conventional or standard or later developed. Those skilled in the art may readily adopt one or more of the aspects, concepts or features of the invention into additional embodiments within the scope of the present invention even if such embodiments are not expressly disclosed herein. Additionally, even though some features, concepts or aspects of the invention may be described herein as being a preferred arrangement or method, such description is not intended to suggest that such feature is required or necessary unless expressly so stated. Still further, exemplary or representative values and ranges may be included to assist in understanding the present invention however, such values and ranges are not to be construed in a limiting sense and are intended to be critical values or ranges only if so expressly stated.

It should be noted that for the purposes of this application, the terms attach (attached), connect (connected), and link (linked) are not limited to direct attachment, connection, or linking but also include indirect attachment, connection, or linking with intermediate parts, components, or assemblies being located between the two parts being attached, connected, or linked to one another. In addition, the terms attach (attached), connect (connected), and link (linked) may include two parts integrally formed or unitarily constructed.

Figure 1:
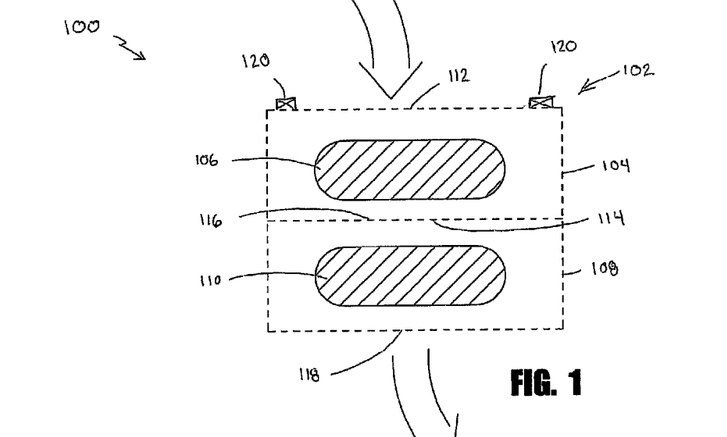
FIG. 1 is a schematic representation of a first embodiment of an exfiltration apparatus as disclosed in the present application.

FIG. 1 schematically illustrates one embodiment of an exfiltration apparatus as disclosed in the present application. The apparatus 100 includes a housing or containment structure 102, within which, one or more filter/sorptive layers may be disposed in order to clean fluid that flows through the housing. The housing 102 may be configured in a variety of ways. Any structure capable of containing and supporting one or more filter/sorptive layers and allow fluid that flows through the housing to come into contact with the layers may be used. In the depicted embodiment, the housing 102 has a first portion 104 containing a first filter/sorptive layer 106 and a second portion 108 containing a second filter/sorptive layer 110. The first portion 104 has a fluid inlet 112 and a fluid outlet 114 and the second portion 108 has a fluid inlet 116 and a fluid outlet 118. The first portion 104 is arranged relative to the second portion 108 such that fluid exiting the fluid outlet 114 of the first portion flows into the fluid inlet 116 of the second portion.

In operation, fluid enters the fluid inlet 112, flows through first filter/sorptive layer 106 in the first portion 104, and exits the fluid outlet 114. Upon exiting the fluid outlet 114, the fluid then enters the fluid inlet 116 of the second portion 108, flows through the second filter/sorptive layer 110, and exits the fluid outlet 118. The first filter/sorptive layer 106 and the second filter/sorptive layer 110 remove suspended and dissolved contaminants from the fluid. A wide variety of filter/sorptive materials may be used in the layers, such as filtration media, adsorption media, coated media (such as amphoteric oxide coated media), or microorganism-containing media (such as a media containing bacteria that can decompose or biodegrade organic material or petrochemicals). Any suitable material capable of removing undesired contaminants or constituents from a fluid may be used. Each filter/sorptive layer may be selected to remove one or more types of contaminants, such as, but not limited to, used motor oil and greases, heavy metals such as cadmium, chromium, copper, lead, and zinc, brake dust, pesticides, salt, deicing chemicals, sediment, phosphorus, and other constituents including tire rubber, nutrients, and organic chemicals and compounds.

Furthermore, each filter/sorptive layer may contain one or more filter/sorptive materials. In the depicted embodiment, the housing 102 contains two filter/sorptive layers. The apparatus 100, however, may contain more or less than two layers. Still further, the amount of filter/sorptive material in each layer may be modified for a given application. Thus, the amount of and type of filtering can be customized for a given application.

The first portion 104 is removable from the second portion 108, thus allowing access to the second filter/sorptive layer 110 via the fluid inlet 116 of the second portion 108 for cleaning and/or replacement. The first portion 104 may include one or more lifting aids 120 attached to the first portion 104 or recessed in a surface of the first portion. A lifting device may connect to the lifting aids 120 to remove the first portion 104 from the second portion 108. For example, the one or more lifting aids 120, may include, but not be limited to, hooks, eyelets, loops, handles, or other suitable structure fixably attached to or recessed in the first portion.

Figure 2:
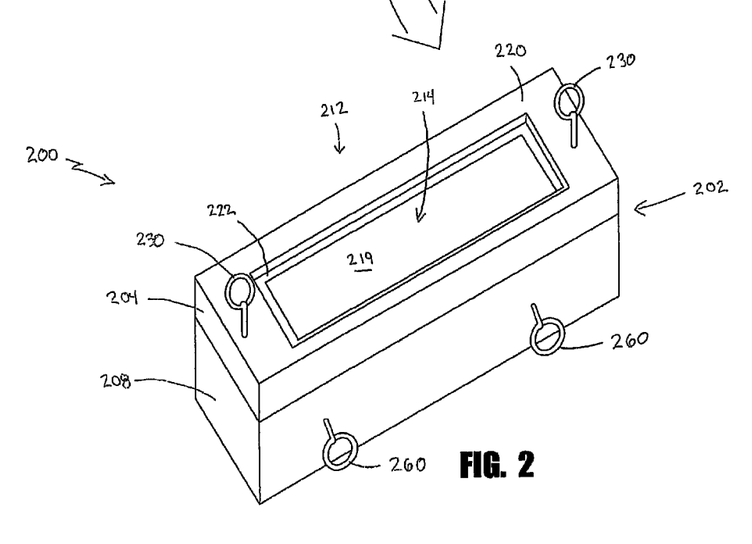
FIG. 2 is a perspective view of a second embodiment of an exfiltration apparatus as disclosed in the present application.
Figure 3:
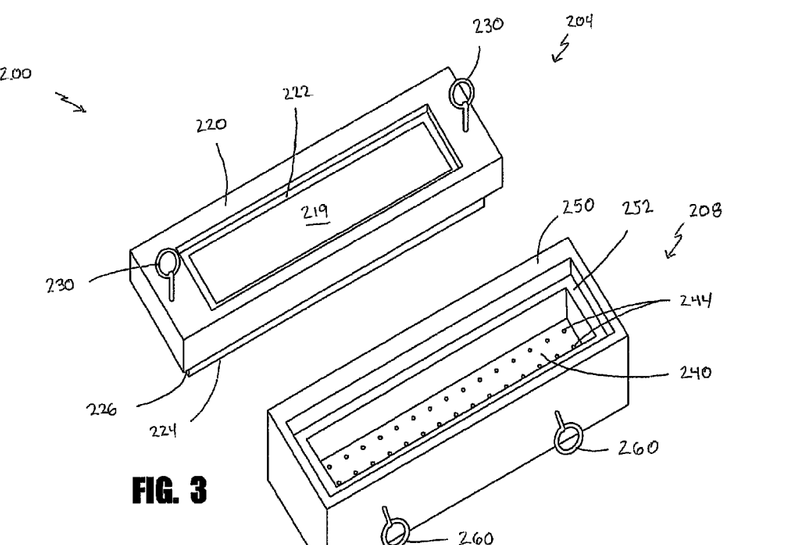
FIG. 3 is a perspective view of the apparatus of FIG. 2 illustrating a first portion of the apparatus being removable from a second portion of the apparatus.

FIGS. 2 and 3 illustrate a second embodiment of an exfiltration apparatus 200 as disclosed in the present application. The depicted embodiment of the exfiltration apparatus 200 is configured as a trench adapted to be installed in the ground. The apparatus 200 includes a housing or containment structure 202, within which one or more filter/sorptive layers may be disposed in order to clean fluid that flows through the housing. The apparatus 200 and housing 202 may be configured in a variety of way, including various shapes, sizes, and materials used. For example, the dimensions and shape of the exfiltration apparatus 200 and housing 202 may vary depending on the design requirements and constraints of the application and installation site, including the area to be drained, the slope, the climate (likely frequency and intensity of weather events; much winter weather may lead to more salt or other deicing chemicals mixed in the runoff), geometry of the site, size of available right-of-way, and other relevant factors. Any structure capable of containing and supporting one or more filter/sorptive layers and allowing fluid to flow through the housing to come into contact with the layers may be used. In the depicted embodiment, the housing 202 has a first portion 204 containing a first filter/sorptive layer 206 and a second portion 208 containing a second filter/sorptive layer 210 (see FIG. 6).

Figures 4, 5:
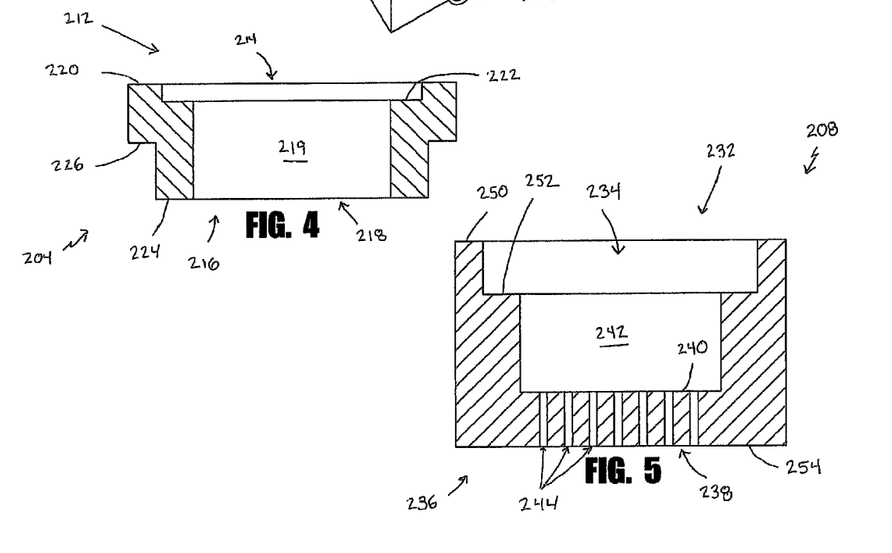
FIG. 4 is a cross-sectional view of the first portion of the apparatus of FIG. 2.
FIG. 5 is a cross-sectional view of the second portion of the apparatus of FIG. 2.

Referring to FIGS. 3 and 4, the first portion 204 is a generally rectangular, box-shaped structure, but a cylindrical design or other shapes are also possible. The first portion 204 includes a first end 212 that defines a fluid inlet 214 and a second end 216 that defines a fluid outlet 218. The fluid inlet 214 and the fluid outlet 218 are connected by a through passage 219. The first end 212 includes a first end face 220 and a recessed border 222 surrounding the fluid inlet 214. The second end 216 includes a second end face 224 and an outer shoulder 226. One or more lifting aids 230 (FIGS. 2 and 3) may be attached to or recessed in the first portion 204 to which a lifting device, such as a hoist, crane, or other lifting means, may attach. The lifting aids 230 may be configured in a variety of ways. For example, the one or more lifting aids 230, may include, but not be limited to, hooks, eyelets, loops, handles, or other suitable structure fixably attached to or recessed in the first portion.

Referring to FIGS. 3 and 5, the second portion 208 is a generally rectangular, box-shaped structure, but a cylindrical design or other shapes are also possible. The second portion 208 includes a first end 232 that defines a fluid inlet 234 and a second end 236 that defines a fluid outlet 238 and includes an end wall 240. The fluid inlet 234 and the fluid outlet 238 are connected by a through passage 242. The fluid outlet 238, in the depicted embodiment, is configured as a plurality of openings 244 located in the end wall 240. The number of openings 244, the size and shape of each opening, and the placement of each opening may vary in other embodiments.

The first end 232 includes a first end face 250 and a recessed border 252 surrounding the fluid inlet 234. The recessed border 252 is configured to receive the second end 216 of the first portion 204. The second end 236 includes a second end face 254 through which the plurality of openings extend.

One or more lifting aids 260 (FIGS. 2 and 3) may be attached to the side of or the interior of the second portion 208, to which a lifting device, such as a hoist, crane, or other lifting means, may attach. The lifting aids 260 may be configured in a variety of ways. For example, the one or more lifting aids 260, may include, but not be limited to, hooks, eyelets, loops, handles, or other suitable structure fixably attached to or recessed in the second portion.

The housing 202 may be made from any suitable material (s) that will provide sufficient structural support for the apparatus when used for a particular application. In the depicted embodiment, the housing 202 is made of class C concrete and may be suitable for installation in the ground next to a roadway. Any suitable method or process to make the apparatus may be used. For example, in one embodiment, forms or moulds of portions of the apparatus may be created and a concrete mixture may be placed in the forms and allowed to solidify and harden.

Figure 6:
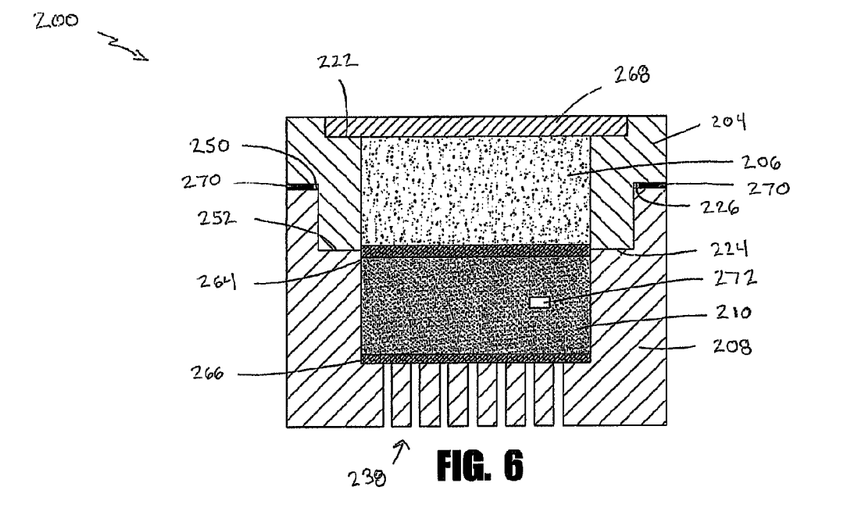
FIG. 6 is a cross-sectional view of the apparatus of FIG. 2.

Referring to FIGS. 2 and 6, the apparatus 200 is illustrated in an assembled condition with the first portion 204 positioned adjacent to or inserted into the second portion 208. The first filter/sorptive layer 206 is positioned within the through passage 219 of the first portion 204. The first filter/sorptive layer may be configured in a variety of ways. Any material or combination of materials that filters larger suspended particles and pollutants from a fluid flowing through the layer, while also not significantly resisting the fluid flow such that fluid back-up readily occurs, may be used. In the depicted embodiment, the first filter/sorptive layer 206 is a porous concrete layer, such as a course aggregate with a cement paste. A porous asphalt layer is another non-limiting example that may be a suitable material for the first filter/sorptive layer.

The second filter/sorptive layer 210 is positioned within the through passage 242 of the second portion 208. The second filter/sorptive layer may be configured in a variety of ways. Any material or combination of materials that removes finer suspended particles or dissolved particles and pollutants from a fluid flowing through the layer, while also not significantly resisting the fluid flow such that fluid back-up readily occurs, may be used. Furthermore the type of and amount of filter/sorptive material or materials used may be selected from a wide variety of suitable materials for a specific application of the apparatus and the specific kind and amount of pollutants and particle desired to be removed. Any suitable material, such as filtration media, adsorption media, and/or coated media (such as amphoteric oxide coated media), capable of removing undesired contaminants or constituents from a fluid may be used. For example, in a particular application, it may be expected that specific pollutants will be present in the fluid being cleaned. The apparatus 200 may include a specific filter/sorptive material capable of removing that specific pollutant. For example, manganese green sand may be used as a filter/sorptive material to remove a dissolved metal from the fluid stream. Furthermore, the amount of the specific filter/sorptive material may be selected based on the desired cleanliness of the fluid exiting the apparatus 200 and the amount of the pollutant expected. In this way, the apparatus 200 is customizable to a particular application. Examples of suitable filter/sorptive materials may include, but are not limited to, sand, coal such as anthracite, garnet, small granular plastics, rubber such as recycled tires, activated carbon, an amphoteric coated media, manganese green sand, a microorganism-containing media, or other suitable materials.

The apparatus 200 also includes one or more layers of geotextile material. The geotextile material may be configured as and selected from a wide range of materials. Any permeable material capable of separating and containing the filter/sorptive layers while permitting the fluid being filtered to readily pass through the material, may be used. In the depicted embodiment, the geotextile material is a fabric. A first geotextile layer 264 is positioned between the first filter/sorptive layer 206 and the second filter/sorptive layer 210 and a second geotextile layer 266 is positioned between the second filter/sorptive layer 210 and the endwall 240.

The apparatus 200 also includes a protective cover 268 for protecting the first filter/sorptive layer 206 from damage. In the depicted embodiment, the cover is realized as a grate. Any structure, however, capable of protecting the first filter/sorptive layer 206 from damage and allowing fluid to readily pass through the structure may be used. The grate 268 may be made of steel or other suitable sturdy material and is configured to be received in the recessed border 222 surrounding the fluid inlet 214 such that grate substantially covers the inlet. The grate 268 may be anchored to the first portion 204 such that it may serve as a lifting aid for the first portion, similar to lifting aides 230, while still being removably attached in a manner that allows easy removal of the grate should maintenance be required to the apparatus 200.

In the assembled condition, the second end 216 of the first portion 204 is received within the recessed border 252 of the second portion 208 such that the second end face 224 and the outer shoulder 226 of the first portion 204 engage or are adjacent the recessed border 252 and the first end face 250 of the second portion 208, respectively. One or more sealing members or materials 270 may be placed between the second end face 224 and the recessed border 252 and/or between the outer shoulder 226 and the first end face 250. In the depicted embodiment, sealing members 270 are positioned between the outer shoulder 226 and the first end face 250 to prevent fluid from exiting the apparatus 200 between the first portion 204 and the second portion 208. In addition, the sealing members 270 may also protect the first portion 204 and second portion 208 from damage during assembly. For example, the one or more sealing members may be made of rubber that not only provides a fluid tight seal between the first portion 204 and second portion 208 when assembled, but also provides a cushioning effect between the portions when the first portion is received by the second portion.

In the assembled condition, therefore, the outlet 218 of the first portion 204 is positioned adjacent the inlet 234 of the second portion 208. Thus, in use, fluid flowing through the apparatus 200 flows through the grate 268, down through the first filter/sorptive layer 206 and out of the outlet 218 of the first portion 204, through the first geotextile material 264, into the inlet 234 of the second portion 208, through the second filter/sorptive layer 210, through the second geotextile material 266, and out of the outlet 238 of the second portion 208. During this process, the filter/sorptive layers remove suspended and/or dissolved particles from the fluid.

The apparatus 200 may be incorporated with, integrated with, or connected to other or additional drainage or treatment systems. For example, the apparatus 200 may be positioned in series with one or more other or additional drainage or treatment devices, such that treated fluid flows from the apparatus into the other device(s) or from the other device(s) into the apparatus. The apparatus 200 may also be positioned in parallel with other or additional drainage or treatment devices.

The apparatus 200 may also include material or structure attached to the side of the apparatus to separate it from the berm, edge of the roadway, or other contiguous materials in order to easily insert the apparatus into position and remove the top portion for maintenance.

In use, the filter/sorptive layers may clog, lose their effectiveness, or otherwise require cleaning and/or replacement. Since the first portion 204 and first filter/sorptive layer 206 are removable as a unit, the filter/sorptive layers are easy to access and replace, if needed. For example, the first portion 204 may be removed and replaced with a new first portion, thus eliminating downtime. The removed first portion 204 may then be cleaned, such as for example by power washing, at a convenient location. Alternatively, the first portion 204 may be cleaned on-site and placed back onto the second portion 208 or the first filter/sorptive layer 206 may be removed from the first portion 204 and replaced with a new layer of material. Since the first portion 204 is removable, the power washing spray can be directed at the outlet 218 of the first portion. Power washing in the reverse direction of fluid flow is more effective because it pushes debris out the way the debris entered rather than driving the debris deeper into the first filter/sorptive layer 206.

Having the first portion 204 removable also allows easy access to the second filter/sorptive layer 210 for cleaning or replacement without damaging the apparatus 200 or the installation site or requiring replacement of the apparatus. Once the second filter/sorptive layer 210 has been cleaned or replaced, the first portion 204 may be replaced on the second portion 208.

The apparatus 200 may also include one or more sensor assemblies 272 (see FIG. 6) to provide information regarding the state of or performance of the apparatus to determine if maintenance is needed for the apparatus. A variety of types of sensors may be used to provide this information and the location of the sensors on or within the apparatus 200 may vary. Any sensor(s), and location of the sensor(s), that is capable of providing information related to the performance of one or more of the filter/sorptive layers may be used. In the depicted embodiment, a dielectric sensor assembly 272 is embedded in the second filter/sorptive layer 210. The dielectric sensor assembly 272 may include a dielectric sensing element, a transmitter, and power source (such a battery) for allowing the sensor assembly to send a signal. The dielectric sensing element measures the dielectric constant of the second filter/sorptive layer 210. The dielectric constant of the second filter/sorptive layer is impacted by heavy metal in the layer (i.e. removed from the fluid) and by the moisture retained in the layer. Both the amount of heavy metal in the filter/sorptive layer and the amount of moisture retained within the layer are instructive as to the life and performance of the layer. For example, if the amount of retained water in the layer is higher than normal during a certain period, this may be indicative of clogging within the layer. Calibration between the dielectric constant of the layer and performance of the layer may be established prior to installation of the apparatus.

The transmitter may remotely transmit a signal indicative of the dielectric constant. An end user may receive the signal via a receiver. Thus, a user with a receiver could walk-by or drive-by the apparatus 200 and readily determine if maintenance is needed.

If the installation site is subject to occasional flooding, a vertical pipe (not shown) can be added to shunt overflow liquid directly to a drainage pipe.

Figure 7:
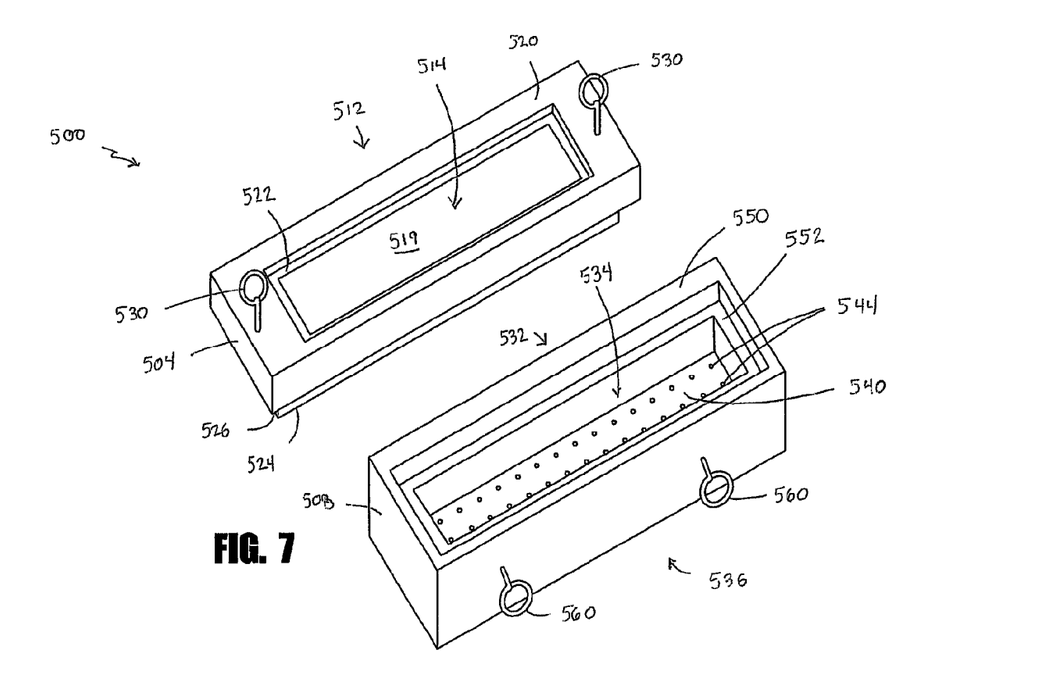
FIG. 7 is a perspective view of a third embodiment of an exfiltration apparatus as disclosed in the present application.
Figure 10:
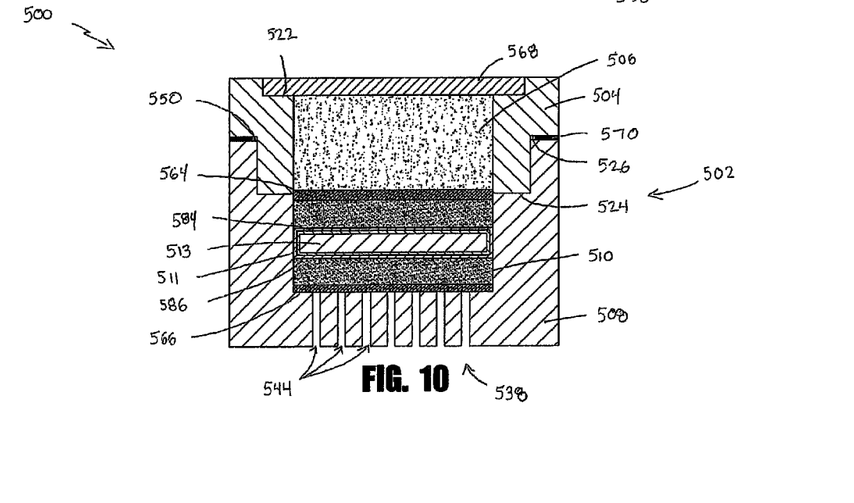
FIG. 10 is a cross-sectional view of the apparatus of FIG. 7.

FIG. 7 illustrates a third embodiment of an exfiltration apparatus 500 as disclosed in the present application. The depicted embodiment of the exfiltration apparatus 500 is configured as a trench adapted to be installed in the ground. The apparatus 500 includes a housing or containment structure 502 (see FIG. 10), within which one or more filter/sorptive layers may be disposed in order to clean fluid that flows through the housing. The apparatus 500 and housing 502 may be configured in a variety of ways, including various shapes, sizes, and materials used. For example, the dimensions and shape of the exfiltration apparatus 500 and housing 502 may vary depending on the design requirements and constraints of the application and installation site, including the area to be drained, the slope, the climate (likely frequency and intensity of weather events; much winter weather may lead to more salt or other deicing chemicals mixed in the runoff), geometry of the site, size of available right-of-way, and other relevant factors. Any structure capable of containing and supporting one or more filter/sorptive layers and allowing fluid to flow through the housing to come into contact with the layers may be used. Referring to FIG. 10, in the depicted embodiment, the housing 502 has a first portion 504 containing a first filter/sorptive layer 506, a second portion 508 containing a second filter/sorptive layer 510, and a container 511 containing a third filter/sorptive layer 513 positioned within the second filter/sorptive layer 510.

Figures 8, 9:
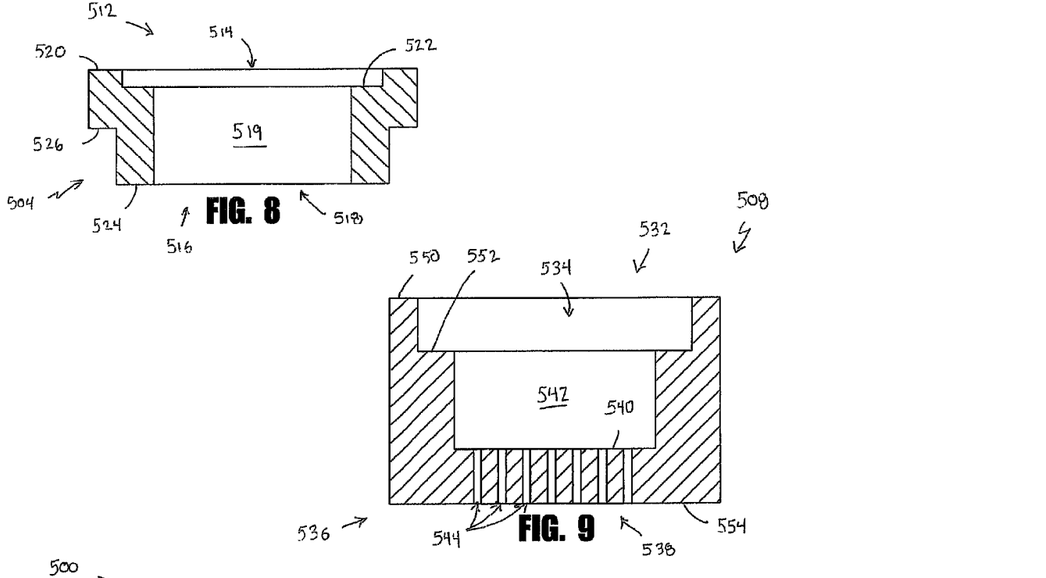
FIG. 8 is a cross-sectional view of the first portion of the apparatus of FIG. 7.
FIG. 9 is a cross-sectional view of the second portion of the apparatus of FIG. 7.

Referring to FIG. 8, the first portion 504 is a generally rectangular, box-shaped structure, but a cylindrical design or other shapes are also possible. The first portion 504 includes a first end 512 that defines a fluid inlet 514 and a second end 516 that defines a fluid outlet 518. The fluid inlet 514 and the fluid outlet 518 are connected by a through passage 519. The first end 512 includes a first end face 520 and a recessed border 522 surrounding the fluid inlet 514. The second end 516 includes a second end face 524 and an outer shoulder 526. One or more lifting aids 530 (see FIG. 7) may be attached to the first end face 520 to which a lifting device, such as a hoist, crane, or other lifting means, may attach. The lifting aids 530 may be configured in a variety of ways. For example, the one or more lifting aids 530, may include, but not be limited to, hooks, eyelets, loops, handles, or other suitable structure fixably attached to or recessed in the first portion.

Referring to FIG. 9, the second portion 508 is a generally rectangular, box-shaped structure, but a cylindrical design or other shapes are also possible. The second portion 508 includes a first end 532 that defines a fluid inlet 534 and a second end 536 that defines a fluid outlet 538 and includes an end wall 540. The fluid inlet 534 and the fluid outlet 538 are connected by a through passage 542. The fluid outlet 538, in the depicted embodiment, is configured as a plurality of openings 544 located in the end wall 540. The number of openings 544, the size and shape of each opening, and the placement of each opening may vary in other embodiments.

The first end 532 includes a first end face 550 and a recessed border 552 surrounding the fluid inlet 534. The recessed border 552 is configured to receive the second end 516 of the first portion 504. The second end 536 includes a second end face 554 through which the plurality of openings extend.

One or more lifting aids 560 (see FIG. 7) may be attached to the side of or the interior of the second portion, to which a lifting device, such as a hoist, crane, or other lifting means, may attach. The lifting aids 560 may be configured in a variety of ways. For example, the one or more lifting aids 560, may include, but not be limited to, hooks, eyelets, loops, handles, or other suitable structure fixably attached to or recessed in the second portion.

The housing 502 may be made from any suitable material (s) that will provide sufficient structural support for the apparatus when used for a particular application. In the depicted embodiment, the housing 502 is made of class C concrete and may be suitable for installation in the ground next to a roadway.

Referring to FIGS. 7 and 10, the apparatus 500 is illustrated in an assembled condition with the first portion 504 is positioned adjacent to the second portion 508. The first filter/sorptive layer 506 is positioned within the through passage 519 of the first portion 504. The first filter/sorptive layer may be configured in a variety of ways. Any material or combination of materials that filters larger suspended particles and pollutants from a fluid flowing through the layer, while also not significantly resisting the fluid flow such that fluid back-up readily occurs, may be used. In the depicted embodiment, the first filter/sorptive layer 506 is a porous concrete layer, such as a course aggregate with a cement paste. A porous asphalt layer is another non-limiting example that may be a suitable material for the first filter/sorptive layer.

The second filter/sorptive layer 510 is positioned within the through passage 542 of the second portion 508 and the third filter/sorptive layer 513 is disposed within the container 511. The second and third filter/sorptive layers may be configured in a variety of ways. Any material or combination of materials that filters finer suspended particles or dissolved particles and pollutants from a fluid flowing through the layers, while also not significantly resisting the fluid flow such that fluid back-up readily occurs, may be used. Furthermore the type of and amount of filter/sorptive material or materials used may be selected from a wide variety of suitable materials for a specific type of application of the apparatus and the specific kind and amount of pollutants and particle desired to be removed. For example, in a particular application, it may be expected that specific pollutant will be present in the fluid being cleaned. The apparatus 500 may include a specific filter/sorptive material capable of removing that specific pollutant.

Furthermore, the amount of the specific filter/sorptive material may be selected based on the desired cleanliness of the fluid exiting the apparatus 500 and the amount of the pollutant expected. In this way, the apparatus 500 is customizable to a particular application. Examples of suitable filter/sorptive materials may include, but are not limited to, sand, coal such as anthracite, garnet, small granular plastics, rubber such as recycled tires, activated carbon, an amphoteric coated media, manganese green sand, microorganism-containing media, or other suitable materials.

The container 511 is positioned within the second filter/sorptive layer 510, though other locations of the container may also be possible, such as for example, between the first filter/sorptive layer 506 and the second filter/sorptive layer 510.

Figure 11:
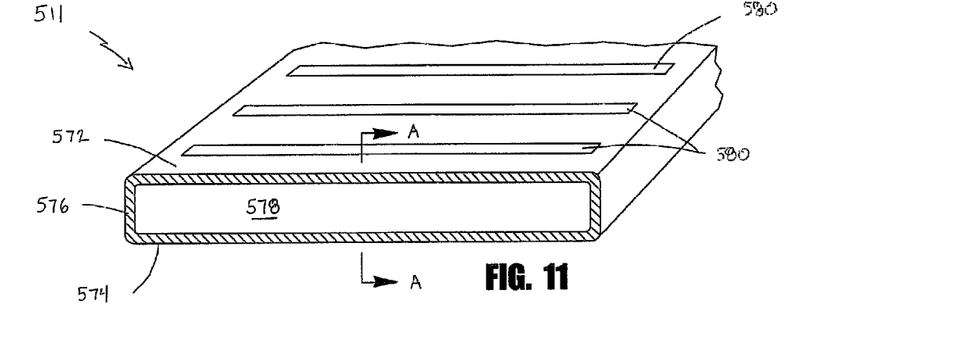
FIG. 11 is sectional view of a container for use with the embodiment of FIG. 7.
Figure 12:
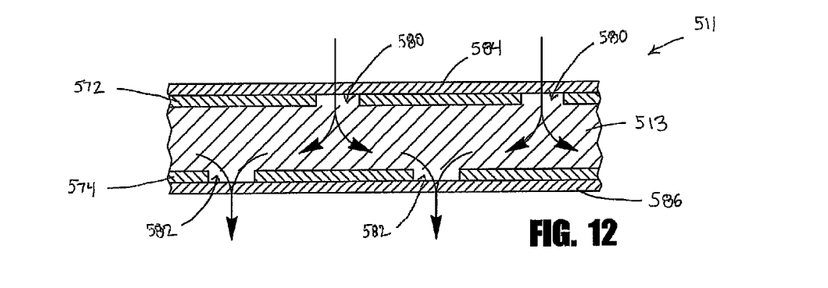
FIG. 12 is a partial sectional view of the container of FIG. 11 taken along line A-A.

Referring to FIGS. 11 and 12, the container 511 may be configured in a variety of ways, such as different shapes, sizes, and materials, and are selectable to the specific installation site conditions. Any structure made from a material suitable for exposure to the fluid being cleaned, which is capable of housing and separating the third filter/sorptive layer from the second filter/sorptive layer while allowing fluid to readily flow through the third filter/sorptive layer, may be used. In the depicted embodiment, the container 511 is a generally rectangular box-shaped structure having a top wall 572 connected to a bottom wall 574 by side walls 576 to form an internal chamber or cavity 578. The top wall 572 and the bottom wall 574 are shaped and sized to substantially span across the through passage 542 of the second portion 508 (see FIG. 9).

The top wall 572 includes a plurality of openings 580 and the bottom wall 574 includes a plurality of openings 582 (see FIG. 12). The number of openings 580, 582, the size and shape of each opening, and the placement of each opening may vary in other embodiments. In the depicted embodiment, the openings 580 on the top wall 572 are staggered or non-contiguous relative to the openings 582 on the bottom wall 574 along the general direction of fluid flow. As a result, fluid that flows into container 511 through the openings 580 in the top wall 572 does not flow through the container in straight path. Instead, the fluid must change direction in order to reach the openings 582 in the bottom wall 574 (see arrows in FIG. 12). Thus, the fluid resides within the container 511 for a longer period of time and is exposed to more of the third filter/sorptive layer 513 than if the fluid flowed through the container in a straight path.

The container 511 is made from a lightweight, thermoplastic material, such as for example polyethylene. A recycled thermoplastic may be used, but that is not required. The surface of the container 511 may also be coated or bonded with an amphoteric material to give the surface of the container a filter/sorptive function. For example, the polyethylene may be coated with a manganese oxide, such as manganese dioxide, for example, which has the capacity to attract heavy metals. Thus, the container 511 itself may act to remove pollutants from fluid that comes into contact with it.

The apparatus 500 also includes one or more layers of geotextile material. The geotextile material may be configured as and selected from a wide range of materials. Any permeable material capable of separating and containing the filter/sorptive layers while permitting the fluid being filtered to readily pass through the material, may be used.

In the depicted embodiment, the geotextile material is a fabric. A first geotextile layer 564 is positioned between the first filter/sorptive layer 506 and the second filter/sorptive layer 510, a second geotextile layer 566 is positioned between the second filter/sorptive layer 510 and the end wall 540, a third geotextile layer 584 is positioned between the second filter/sorptive layer 510 and the top wall 572 of the container 511, and a fourth geotextile layer 586 is positioned between the second filter/sorptive layer 510 and the bottom wall 574 of the container 511. As shown in FIG. 10, the third and fourth geotextile layers 584, 586 may be formed by a single layer wrapped around the container 511. In other embodiments, however, a plurality of sheets or sections of geotextile material may be provided. The first geotextile layer 564 keeps the first filter/sorptive layer 506 separate from the second filter/sorptive layer 510, the second geotextile layer 566 keeps the second filter/sorptive layer 510 from exiting the apparatus 500 via the outlet 538, and the third and fourth geotextile layers 584, 586 keep the third filter/sorptive layer 513 within the container 511 and separate from the second filter/sorptive layer 510.

The apparatus 500 also includes a protective cover 568 for protecting the first filter/sorptive layer 506 from damage. In the depicted embodiment, the cover is realized as a grate. Any structure, however, capable of protecting the first filter/sorptive layer 506 from damage and allowing fluid to readily pass through the structure may be used. The grate 568 may be made of steel or other suitable sturdy material and is configured to be received in the recessed border 522 surrounding the fluid inlet 514 such that grate substantially covers the inlet. The grate 568 may be anchored to the first portion 504 such that it may serve as a lifting aid for the first portion, similar to lifting aides 530, while still be removably attached in a manner that allows easy removal of the grate should maintenance be required to the apparatus 500.

In the assembled condition, the second end 516 of the first portion 504 is received within the recessed border 552 of the second portion 508 such that the second end face 524 and the outer shoulder 526 of the first portion 504 engage or are adjacent the recessed border 552 and the first end face 550 of the second portion 508, respectively. One or more sealing members or materials may be placed between the second end face 524 and the recessed border 552 and/or between the outer shoulder 526 and the first end face 550. In the depicted embodiment, sealing members 570 as positioned between the outer shoulder 526 and the first end face 550 to prevent fluid from exiting the apparatus 500 between the first portion 504 and the second portion 508. In addition, the sealing members 570 may also protect the first portion 504 and second portion 508 from damage during assembly. For example, the one or more sealing members may be made of rubber that not only provides a fluid tight seal between the first portion 504 and second portion 508 when assembled, but also provides a cushioning effect between the portions when the first portion is received by the second portion.

In the assembled condition, therefore, the outlet 518 of the first portion 504 is positioned adjacent to the inlet 534 of the second portion 508. Thus, in use, fluid flowing through the apparatus 500 flows through the grate 568, down through the first filter/sorptive layer 506 and out of the outlet 518 of the first portion 504, through the first geotextile layer 564, into the inlet 534 of the second portion 508, through a portion of the second filter/sorptive layer 510, through the third geotextile material 584, into the container 511, through the third filter/sorptive layer 513, out of the container, through the fourth geotextile material 586, through a second portion of the second filter/sorptive layer 510, through the second geotextile layer 566, and out of the outlet 538 of the second portion 508. During this process, the filter/sorptive layers remove suspended and/or dissolved particles from the fluid.

In use, the filter/sorptive layers may clog, lose their effectiveness, or otherwise require cleaning and/or replacement.

The removable first portion 504 (and first filter/sorptive layer 506) allows easy replacement of and access to the filter/sorptive layers. For example, the first portion 504 may be removed and replaced with a new first portion, thus eliminating downtime. The removed first portion 504 may then be cleaned, such as for example by power washing, at a convenient location. Alternatively, the first portion 504 may be cleaned on-site and placed back onto the second portion 508 or the first filter/sorptive layer 506 may be removed from the first portion and replaced by a new layer of material. Since the first portion 504 is removable, the power washing spray can be directed at the outlet 518 of the first portion. Power washing in the reverse direction of flow is more effective because it pushes debris out the way the debris entered rather than driving the debris deeper into the first filter/sorptive layer 506.

Having the first portion 504 removable also allows easy access to the second filter/sorptive layer 510 and the third filter/sorptive layer 513 within the container 511. Thus, the second filter/sorptive layer can be cleaned or replaced easily and the container 511 can be removed and replaced with a new or recharged container and filter/sorptive layer. Alternatively, new or recharged filter/sorptive material could be added to the container to replace the used material or the used material could be cleaned. Once the second filter/sorptive layer has been cleaned or replaced, the first portion 504 may be replaced on the second portion 508.

If the installation site is subject to occasional flooding, a vertical pipe (not shown) can be added to shunt overflow liquid directly to a drainage pipe.

Figure 13:
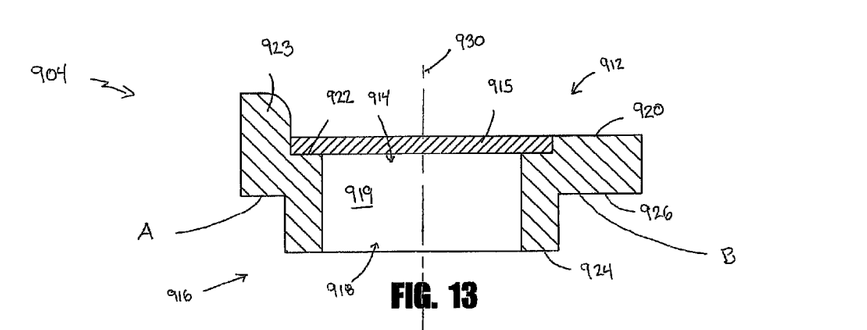
FIG. 13 is a cross sectional view of a second embodiment of a top portion for an exfiltration apparatus as disclosed in the present application.

FIG. 13 illustrates another embodiment of a first portion 904 for the exfiltration apparatus as disclosed in the present application. The first portion 904 is a generally rectangular, box-shaped structure, but a cylindrical design or other shapes are also possible. The first portion 904 includes a first end 912 that defines a fluid inlet 914 and a second end 916 that defines a fluid outlet 918. The fluid inlet 914 and the fluid outlet 918 are connected by a through passage 919. The first end 912 includes a first end face 920, a recessed border 922 surrounding the fluid inlet 914 for receiving a cover, such as a grate, and an integrally formed ridge 923 extending outward from the end face along the length of one side of the first portion 904. In the depicted embodiment, the ridge 923 is designed as a curb for installation along a roadway. The second end 916 includes a second end face 924 and an outer shoulder 926. The outer shoulder 926 on the side of the first portion 904 indicated as B in FIG. 13 is wider than the outer shoulder on the side indicated as A in order to offset the weight of the ridge 923. Thus, the first portion 904 remains balanced about the axis 930.

Figure 14:
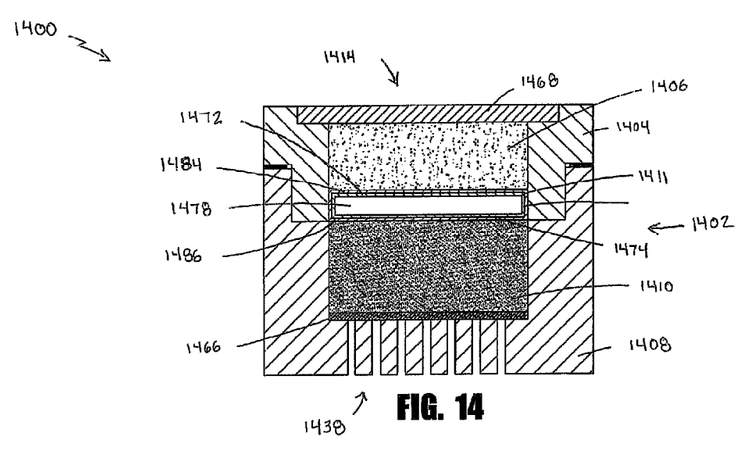
FIG. 14 is a cross sectional view of a fourth embodiment of an exfiltration apparatus as disclosed in the present application.

FIG. 14 illustrates a fourth embodiment of an exfiltration apparatus 1400 as disclosed in the present application. The depicted apparatus 1400 is substantially similar to the apparatus 200 of FIG. 28. In particular, the apparatus 1400 includes a housing or containment structure 1402, within which, one or more filter/sorptive layers may be disposed in order to clean fluid that flows through the housing. The housing 1402 may be configured in a variety of ways. Any structure capable of containing and supporting one or more filter/sorptive layers and allow fluid that flows through the housing to come into contact with the layers may be used. In the depicted embodiment, the housing 1402 has a first portion 1404 containing a first filter/sorptive layer 1406 and a second portion 1408 containing a second filter/sorptive layer 1410.

As with the apparatus 200, the first portion 1404 and first filter/sorptive layer 1406 are assembled with the second portion 1408 and the second filter/sorptive layer 1410, such that fluid flows in an inlet 1414 defined by the first portion 1404, through the first filter/sorptive layer 1406, through the second filter/sorptive layer 1410, and out an exit 1438 defined by the second portion 1408. The filter/sorptive layers 1406, 1410 remove suspended and dissolved contaminants from the fluid. As with apparatus 200, a wide variety of filter/sorptive materials may be used in the layers, such as filtration media, adsorption media, coated media (such as amphoteric oxide coated media), or microorganism-containing media (such as a media containing bacteria that can decompose or biodegrade organic material or petrochemicals). Any suitable material capable of removing undesired contaminants or constituents from a fluid may be used. Each filter/sorptive layer may be selected to remove one or more types of contaminants, such as, but not limited to, used motor oil and greases, heavy metals such as cadmium, chromium, copper, lead, and zinc; brake dust, pesticides, salt, deicing chemicals, sediment, phosphorus, and other constituents including tire rubber, nutrients, and organic chemicals and compounds.

The apparatus 1400, however, includes a container 1411 defining a fluid retaining chamber 1478 generally between the first filter/sorptive layer 1406 and the second filter/sorptive layer 1410. The fluid retaining chamber 1478 is configured and positioned to serve as an open volume in which fluid may accumulate. The container 1411 may be configured in a variety of ways. Any structure capable of defining an open volume within or between filter/sorptive layers may be used. In the depicted embodiment, the container 1411 is substantially similar to the container 511 of FIG. 11 in that the container is a generally rectangular box-shaped structure having a top wall 1472 connected to a bottom wall 1474 by side walls 1476 to form the internal chamber or cavity 1478. The top wall 1472 and the bottom wall 1474 are shaped and sized to substantially span across the interior of the housing 1402. Openings (not shown), similar to the openings 580 and 582 of FIGS. 11 and 12, are located on the top wall 1472 and the bottom wall 1474 to allow fluid to flow into and out of the container.

The apparatus 1400 also includes one or more layers of geotextile material. The geotextile material may be configured as and selected from a wide range of materials. Any permeable material capable of separating and containing the filter/sorptive layers while permitting the fluid being filtered to readily pass through the material, may be used.

In the depicted embodiment, the geotextile material is a fabric. A first geotextile layer 1484 is positioned between the first filter/sorptive layer 1406 and the top wall 1472 of the container 1411, and a second geotextile layer 1486 is positioned between the second filter/sorptive layer 1410 and the bottom wall 1474 of the container 1411, and a third geotextile layer 1466 is positioned between the second filter/sorptive layer 1410 and the exit 1438. As shown in FIG. 14, the first and second geotextile layers 1484, 1486 may be formed by a single layer wrapped around the container 1411. In other embodiments, however, a plurality of sheets or sections of geotextile material may be provided.

The apparatus 1400 also includes a protective cover 1468 for protecting the first filter/sorptive layer 1406 from damage. In the depicted embodiment, the cover is realized as a grate. Any structure, however, capable of protecting the first filter/sorptive layer 1406 from damage and allowing fluid to readily pass through the structure may be used. The grate 1468 may be made of steel or other suitable sturdy material and is configured to be received by the first portion 1404 such that grate substantially covers the fluid inlet 1414. The grate 1468 may be anchored to the first portion 1404 such that it may serve as a lifting aid for the first portion, while still be removably attached in a manner that allows easy removal of the grate should maintenance be required to the apparatus 1400.

In the illustrated embodiment, the first filter/sorptive layer 1406 is configured to remove larger suspended contaminants and pollutants while the second filter/sorptive layer 1410 is configured to remove smaller suspended or dissolved contaminants and pollutants. As a result of providing finer filtering, the flow resistance in the second filter/sorptive layer is generally greater than the flow resistance in the first filter/sorptive layer. Over time, fluid flow through both of the filter/sorptive layers becomes more restricted due to the presence of the contaminants and pollutants removed from the fluid stream (i.e. the layers gradually begin to clog or plug). When the amount of fluid flow entering the apparatus 1400 exceeds that amount of flow that the second filter/sorptive layer 1410 can pass through, fluid will "back-up." Because the first filter/sorptive layer 1406 fills most of the first portion 1404, there is little excess volume within the first filter/sorptive layer to hold the fluid "back-up." Once the fluid back-up has filled the first filter/sorptive layer 1406, no additional fluid can enter the apparatus 1400 to be cleaned. The fluid retaining chamber 1478, however, provides an open volume in which fluid can accumulate. As a result, for a given flow resistance of the second filter/sorptive layer 1410, the amount of fluid back-up that the apparatus 1400 may hold is greater with the presence of the fluid retaining chamber 1478 than without it.

One of ordinary skill in the art will understand that various embodiments of the disclosed apparatus may include one or more of the features disclosed in the illustrated embodiments, such as for example, a sensor assembly, a container housing a filter/sorptive material, and a container providing a fluid retention volume. The inventions have been described with reference to various embodiments. Modification and alterations will occur to others upon a reading and understanding of this specification and drawings. The inventions are intended to include all such modifications and alterations insofar as they come within the scope of the appended claims and equivalents thereof.

The invention claimed is:

1. An exfiltration apparatus for removing contaminants from a fluid, the apparatus comprising:
   a housing defining a fluid flow path;
   a first filter/sorptive layer positioned within a first portion of the housing;
   a layer of filtration media positioned within a second portion of the housing;
   a container disposed within the layer of filtration media, thereby separating an upper portion of the layer of filtration media from a lower portion of the layer of filtration media; and
   a second filter/sorptive layer disposed within the container, wherein the container includes a plurality of flow openings;
   wherein fluid flowing along the fluid flow path passes through the first filter/sorptive layer, through the upper portion of the layer of filtration media, and through the second filter/sorptive layer within the container before passing through the lower portion of the layer of filtration media and exiting the housing.

2. The apparatus of claim 1 wherein the first portion of the housing and first filter/sorptive layer are removable as a unit from the second portion of the housing.

3. The apparatus of claim 1 wherein the container is made from a thermoplastic coated with an amphoteric oxide.

4. The apparatus of claim 3 wherein the thermoplastic is polyethylene and the amphoteric oxide is manganese dioxide.

5. The apparatus of claim 1 further comprising a sensor assembly capable of transmitting a signal indicative of filter/sorptive performance of at least one of the first filter/sorptive layer, the layer of filtration media, and the second filter/sorptive layer.

6. The apparatus of claim 1 further comprising a grate attached to the first portion and covering the first fluid inlet.

7. A method of installing an exfiltration apparatus along a roadway, the method comprising:
   placing a bottom housing portion in a ground region along a roadway, the bottom housing portion comprising an uppermost end face defining a bottom fluid inlet, a lowermost end face defining a bottom fluid outlet, a surrounding sidewall extending from the uppermost end face to the lowermost end face to define a bottom through passage connecting the bottom fluid inlet to the bottom fluid outlet, and a recessed border vertically displaced from the uppermost end face and extending laterally inward of the uppermost end face-wherein a bottom filter/sorptive layer is disposed in the bottom through passage;
   lowering a top housing portion into the bottom fluid inlet, the top housing portion comprising an uppermost end face defining a top fluid inlet, a lowermost end face defining a top fluid outlet, and a surrounding sidewall extending from the uppermost end face to the lowermost end face to define a top through passage connecting the first fluid inlet to the first fluid outlet, wherein a layer of filtration media is disposed in the top through passage, and further wherein the lowermost end face of the top housing portion is positioned below the uppermost end face of the bottom housing portion to confront the recessed border, with at least a portion of the layer of filtration media being vertically disposed between the uppermost end face of the bottom housing portion and the lowermost end face of the top housing portion; and
   positioning the top housing such that the uppermost end face of the top housing is contiguous with the roadway.

8. The method of claim 7, wherein lowering the top housing portion into the bottom fluid inlet further comprises confronting an outer shoulder of the top housing portion with the uppermost end face of the bottom housing portion, the outer shoulder being vertically displaced from the lowermost end face of the top housing and extending laterally outward of lowermost end face of the top housing portion.

* * * * *